United States Patent
Kimura et al.

(10) Patent No.: US 12,337,881 B2
(45) Date of Patent: Jun. 24, 2025

(54) BODY BOLSTER STRUCTURE FOR RAILWAY VEHICLE, AND RAILWAY VEHICLE

(71) Applicant: HITACHI, LTD., Tokyo (JP)

(72) Inventors: Sota Kimura, Tokyo (JP); Kyouji Takahara, Tokyo (JP)

(73) Assignee: HITACHI, LTD., Tokyo (JP)

(*) Notice: Subject to any disclaimer, the term of this patent is extended or adjusted under 35 U.S.C. 154(b) by 654 days.

(21) Appl. No.: 17/762,427

(22) PCT Filed: Jul. 6, 2020

(86) PCT No.: PCT/JP2020/026425
§ 371 (c)(1),
(2) Date: Mar. 22, 2022

(87) PCT Pub. No.: WO2022/009271
PCT Pub. Date: Jan. 13, 2022

(65) Prior Publication Data
US 2022/0332355 A1    Oct. 20, 2022

(51) Int. Cl.
*B61F 1/14* (2006.01)
*B61F 1/12* (2006.01)

(52) U.S. Cl.
CPC . *B61F 1/14* (2013.01); *B61F 1/12* (2013.01)

(58) Field of Classification Search
CPC ...... B61F 1/00; B61F 1/08; B61F 1/14; B61F 5/02; B61F 1/12; B61F 5/52; B61F 5/04
See application file for complete search history.

(56) References Cited

U.S. PATENT DOCUMENTS

| | | | | |
|---|---|---|---|---|
| 475,023 A | * | 5/1892 | Schoen | B61F 5/04 105/229 |
| 734,324 A | * | 7/1903 | Hastings | B61F 1/12 105/228 |

(Continued)

FOREIGN PATENT DOCUMENTS

| | | | | |
|---|---|---|---|---|
| CN | 105667531 A | | 6/2016 | |
| CN | 107933597 A | * | 4/2018 | B61F 5/02 |

(Continued)

OTHER PUBLICATIONS

International Search Report of PCT/JP2020/026425 dated Sep. 1, 2020.

(Continued)

*Primary Examiner* — S. Joseph Morano
*Assistant Examiner* — Cheng Lin
(74) *Attorney, Agent, or Firm* — MATTINGLY & MALUR, PC

(57) ABSTRACT

A bolster structure is capable of securing a prescribed space between a bolster and an underframe, maintaining the rigidity of the bolster structure, and reducing its weight and cost. The bolster structure is provided on an underframe constituting a floor of a railroad vehicle, and is formed by joining a plurality of shaped members having a multi-layer structure in which a width direction of the structure body is an extrusion direction. The plurality of shaped members include: shaped members 15B and 15C having a region in which a part of layers on an underframe side is notched at a center of the structure body in the width direction; and shaped members including a fastening portion formed by notching a part of layers at both ends of the structure body in the width direction. A side beam of the underframe is fixed by the fastening portion.

5 Claims, 14 Drawing Sheets

(56) References Cited

U.S. PATENT DOCUMENTS

| | | | | |
|---|---|---|---|---|
| 762,286 A | * | 6/1904 | Crone | B61F 5/04 |
| | | | | 105/229 |
| 2015/0203130 A1 | * | 7/2015 | Langert | B61D 17/10 |
| | | | | 105/422 |

FOREIGN PATENT DOCUMENTS

| | | | | |
|---|---|---|---|---|
| CN | 109229128 A | | 1/2019 | |
| CN | 110155097 A | | 8/2019 | |
| EP | 2540592 A1 | | 6/2011 | |
| EP | 2500231 A1 | | 9/2012 | |
| JP | 2002-145060 A | | 5/2002 | |
| JP | 2012025325 A | * | 2/2012 | |
| JP | 2013001198 A | * | 1/2013 | B61F 1/08 |
| JP | 2017013667 A | | 1/2017 | |
| JP | 2018058387 A | | 4/2018 | |
| WO | 2016178265 A1 | | 11/2016 | |
| WO | WO-2018181916 A1 | * | 10/2018 | B61B 13/00 |

OTHER PUBLICATIONS

Indian Office Action received in corresponding Indian Application No. 202217015796 dated Feb. 9, 2023.

* cited by examiner

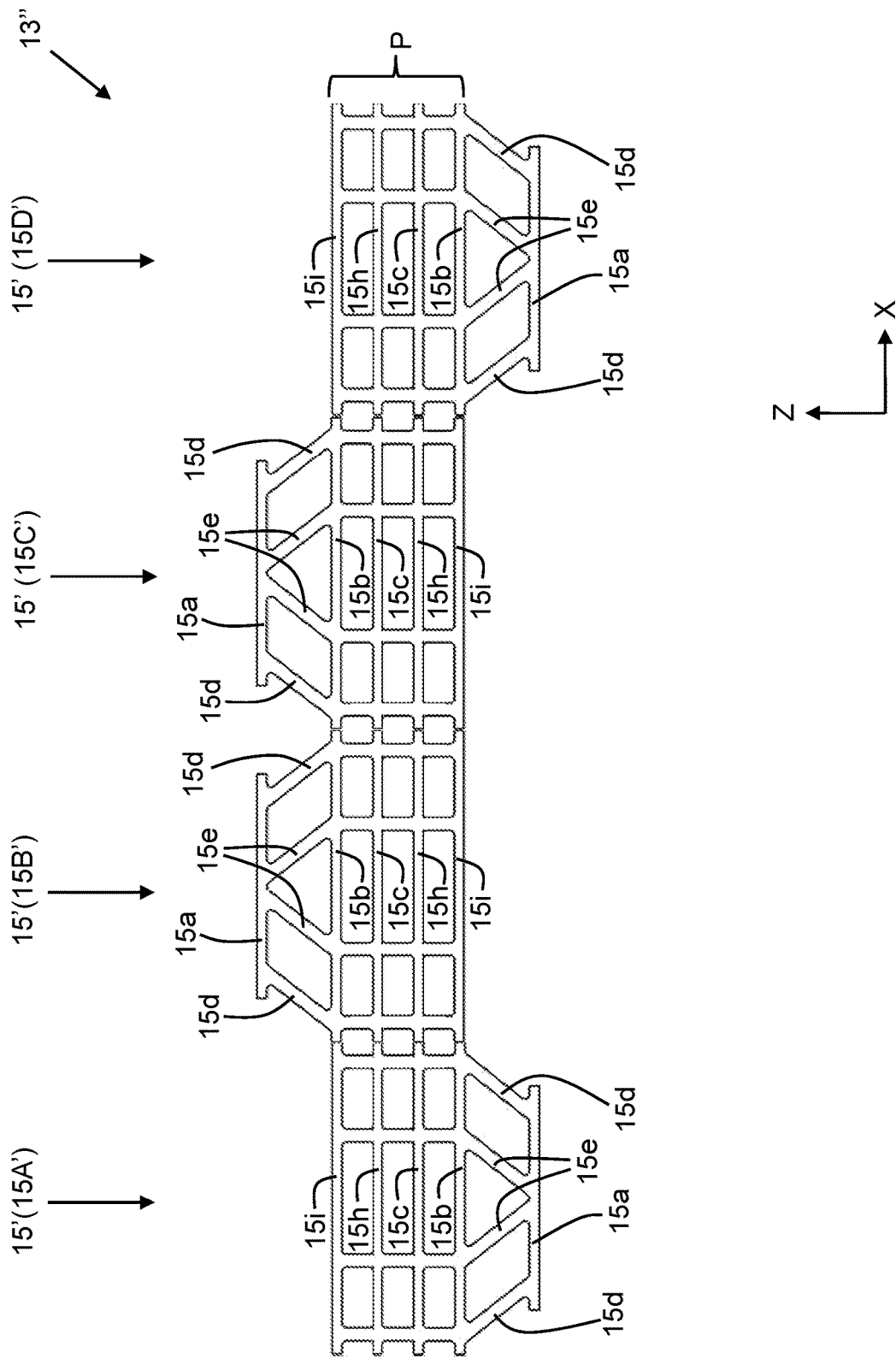

BODY BOLSTER STRUCTURE FOR RAILWAY VEHICLE, AND RAILWAY VEHICLE

TECHNICAL FIELD

The present invention relates to a bolster structure of a railroad vehicle and a railroad vehicle, and more particularly to a bolster structure of a railroad vehicle capable of securing a space between a bolster and an underframe, and a railroad vehicle including the bolster structure.

BACKGROUND ART

In general, a vehicle structure body (hereafter referred to as a structure body) is a hexahedron structure including an underframe forming a floor surface, side structure bodies provided at both ends of the underframe in a width direction, end construction bodies provided at both ends of the underframe in a longitudinal direction, and roof structure bodies provided on top of the side structure bodies and the end construction bodies.

The underframe includes side beams provided along the longitudinal direction of the underframe at both ends of the underframe in the width direction, end beams connecting both ends of the side beams in the longitudinal direction, bolsters provided along the end beams at a predetermined distance from the longitudinal ends of the structure body, and center beams that are provided along the longitudinal direction of the structure body and that connect the end beams and the bolsters to the structure body.

A central pin provided on the lower surface of the bolster along an upper-lower direction of the structure body is connected to a bogie frame constituting a bogie. When a vehicle is accelerated and decelerated, the load in a front-rear direction of the vehicle is transmitted from the bogie to the bolster via the central pin.

On the other hand, from the viewpoint of improving the assembly property of railroad vehicles, it is required to facilitate the attachment of wiring and ducts attached under the floor. To facilitate the attachment, it is effective to form a certain space between the underframe and the bolster and assemble the wiring and the ducts to the structure body in the state in which the bolster is attached to the bogie. As a bogie structure equipped with such a bolster, PTLS 1 and 2 propose a bogie including a bolster that is bolted only to a side beam.

CITATION LIST

Patent Literature

PTL 1: Europe Patent Application Publication No. 2500231
PTL 2: Europe Patent Application Publication No. 2540592

SUMMARY OF INVENTION

Technical Problem

In an underframe structure of a railroad vehicle, in the case of a structure in which a bolster is connected only to a side beam, the bolster is twisted and deformed due to the moment load transmitted from a bogie to the bolster via a central pin. The vertical load transmitted from the bogie via an air spring due to the vertical vibration during traveling causes bending deformation of the bolster.

In a bogie structure provided with the bolsters described in PTLS 1 and 2, the bolster structure includes ribs and face plates having a uniform cross section along a width direction of the vehicle structure body. With this configuration, the bolster is more likely to become heavier, and the size of the space between the bolster and the underframe may be restricted. The cost becomes high since the structure includes the dedicated ribs and face plates.

In view of the above problems, an object of the invention is to provide a bolster structure capable of securing a prescribed space between a bolster and an underframe, maintaining the rigidity of the bolster structure, and reducing the weight and cost of the bolster structure, and a railroad vehicle including the bolster structure.

Solution to Problem

To achieve the above object, one of the typical bolster structures according to the invention is a bolster structure provided on an underframe constituting a floor of a structure body of a railroad vehicle, in which the bolster structure is formed by joining a plurality of shaped members having a multi-layer structure in which a width direction of the structure body is an extrusion direction, the plurality of shaped members include a shaped member having a region in which a part of layers on an underframe side is notched at a center of the structure body in the width direction, and a shaped member including a fastening portion formed by notching a part of layers at both ends of the structure body in the width direction, and a side beam of the underframe is fixed by the fastening portion.

Advantageous Effect

According to the invention, a bolster structure capable of securing a prescribed space between a bolster and an underframe, maintaining the rigidity of the bolster structure, and reducing the cost, and a railroad vehicle including the bolster structure can be provided.

Problems, configurations, and effects other than those described above will become apparent based on the following embodiments.

BRIEF DESCRIPTION OF DRAWINGS

FIG. 14 is a diagram showing a connection state of shaped members used in the bolster according to the third embodiment of the invention.

DESCRIPTION OF EMBODIMENTS

Figure 1:
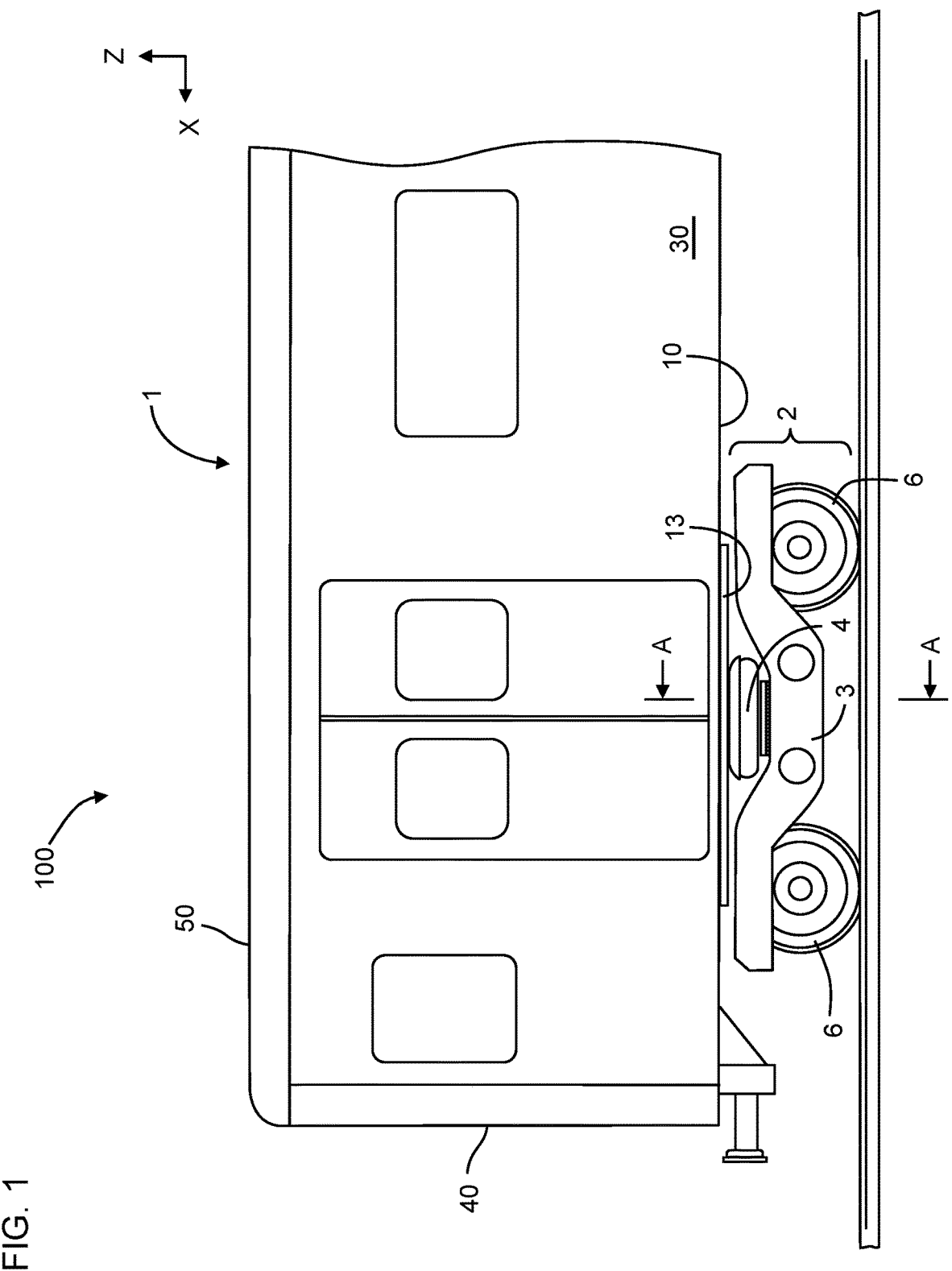
FIG. 1 is a side view showing a railroad vehicle according to a first embodiment of the invention.

Embodiments of the invention will be described in detail with reference to FIGS. 1 to 14. First, directions in the drawings are defined. A traveling direction or a longitudinal direction (front-back direction) of a railroad vehicle 100 (structure body 1) is an X direction, a width direction (left-right direction) of the railroad vehicle 100 (structure body 1) is a Y direction, and a height direction (upper-lower direction) of the railroad vehicle 100 (structure body 1) is a Z direction. Hereinafter, these directions may be simply referred to as the X direction, the Y direction, and the Z direction.

First Embodiment

Figure 2:
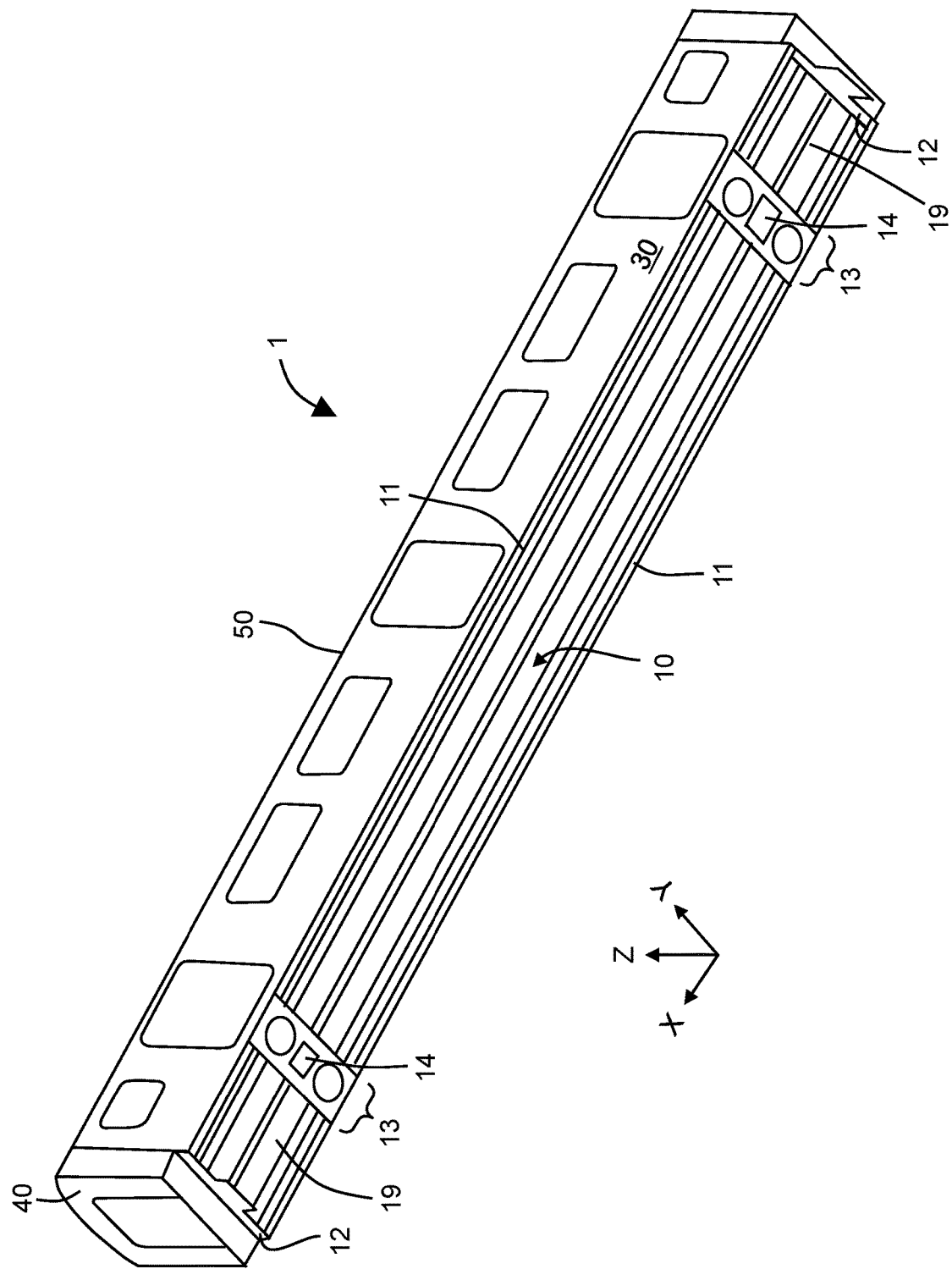
FIG. 2 is a bottom perspective view showing a vehicle structure body according to the first embodiment of the invention.

FIG. 1 is a side view showing a railroad vehicle according to a first embodiment of the invention. FIG. 2 is a bottom perspective view showing a vehicle structure body according to the first embodiment of the invention.

A railroad vehicle 100 includes a structure body 1 and a bogie 2 that supports the structure body 1 under the structure body 1.

The structure body 1 is a hexahedron structure including an underframe 10 forming a floor surface, side structure bodies 30 provided at both ends of the underframe 10 in a width direction, end construction bodies 40 provided at both ends of the underframe in a longitudinal direction, and roof structure bodies 50 provided on top of the side structure bodies 30 and the end construction bodies 40.

The underframe 10 includes a side beam 11, an end beam 12, a bolster 13, and a center beam 19. The side beams 11 are provided at both ends of the underframe 10 in the width direction (Y direction) along the longitudinal direction (X direction). The end beams 12 connect both ends of the side beams 11 in the longitudinal direction (X direction). The bolsters 13 are provided at positions at a predetermined distance from ends of the structure body 1 in the longitudinal direction (X direction) along the width direction (Y direction) of the underframe 10. The center beam 19 is provided along the longitudinal direction (X direction) of the structure body 1 in a manner of connecting the end beam 12 and the bolster 13.

The bogie 2 is provided under the bolster 13, and is rotatable with respect to the underframe 10 around a central pin 14 along the Z direction in a horizontal plane. The bogie 2 includes a bogie frame 3 and wheels 6 fixed to both ends of an axle. The axle is held rotatably with respect to the bogie frame 3. The bogie 2 supports the underframe 10 via air springs 4 provided on both sides of the bogie 2 in the Y direction near the center of the bogie 2 in the X direction.

The central pin 14 provided on the lower surface of the bolster 13 along the upper-lower direction of the structure body 1 is connected to the bogie frame 3. When a vehicle is accelerated and decelerated, the load in the front-rear direction of the vehicle is transmitted from the bogie 2 to the bolster 13 via the central pin 14.

Figure 3:
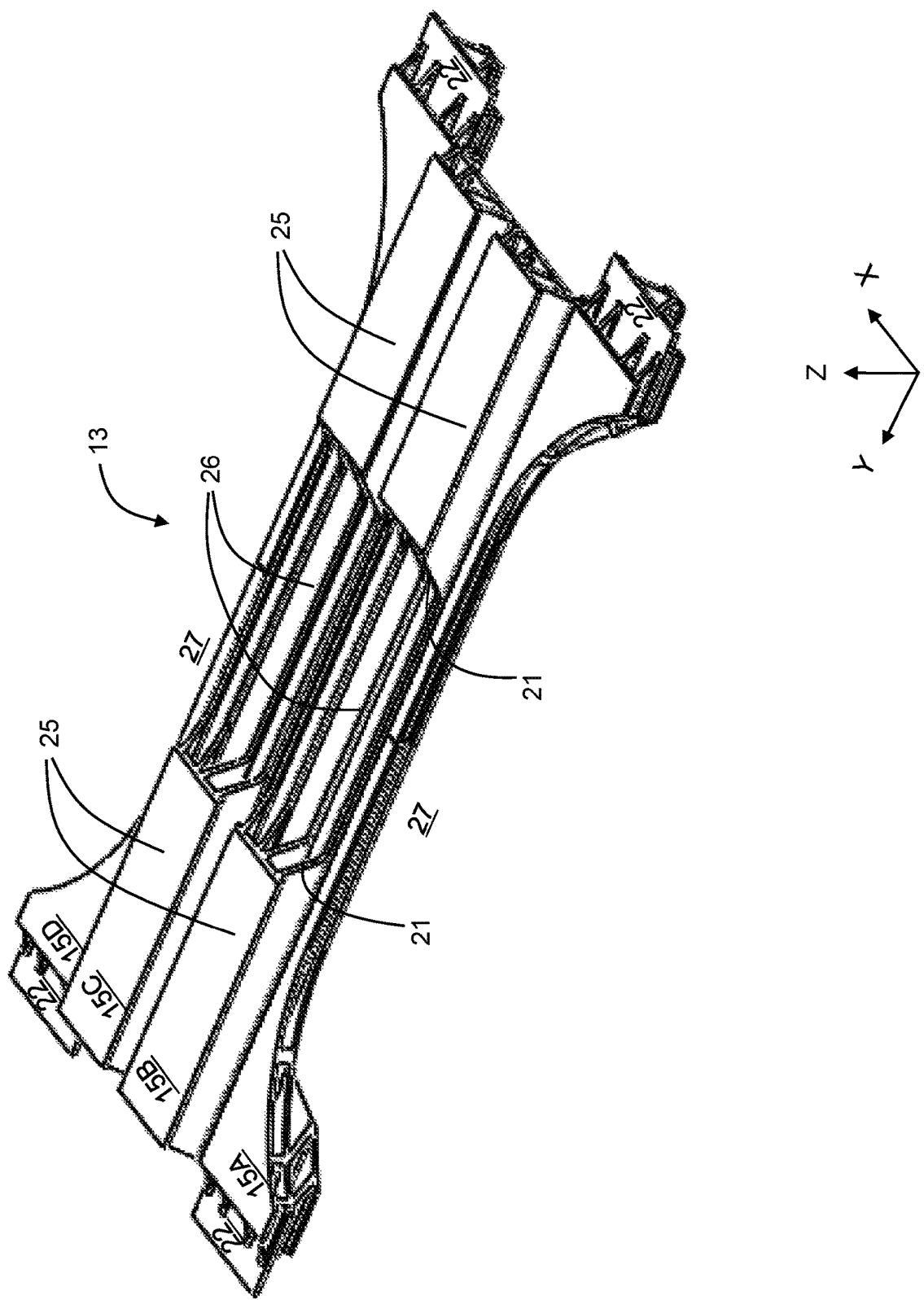
FIG. 3 is a perspective view showing an appearance of an upper surface side of a bolster according to the first embodiment of the invention.

FIG. 3 is a perspective view showing an appearance of an upper surface side of a bolster according to the first embodiment of the invention. The bolster 13 has a structure formed by joining four shaped members 15A, 15B, 15C, and 15D side by side in the X direction. These shaped members are extruded-shaped members and have a hollow portion inside. An extrusion direction is the Y direction.

In the shaped members 15B and 15C at the center in the X direction, upper protrusions 25 that protrude above upper surfaces of the shaped members 15A and 15D at both ends are formed along the Y direction. A central notch 26 in which a part of a region of the upper protrusion 25 is notched downward is formed at the center of the upper protrusion 25 in the Y direction. An upper surface of the notched portion is formed lower than an upper surface of the upper protrusion 25 via a step 21, and is at the same height as or close to the upper surfaces of the shaped members 15A and 15D at both ends. The shaped members 15A and 15D at both ends project downward. Both ends of the shaped members 15A and 15D in the X direction are formed with side notches 27 obtained by notching parts other than both ends in the Y direction for the entire side surface.

Figure 4:
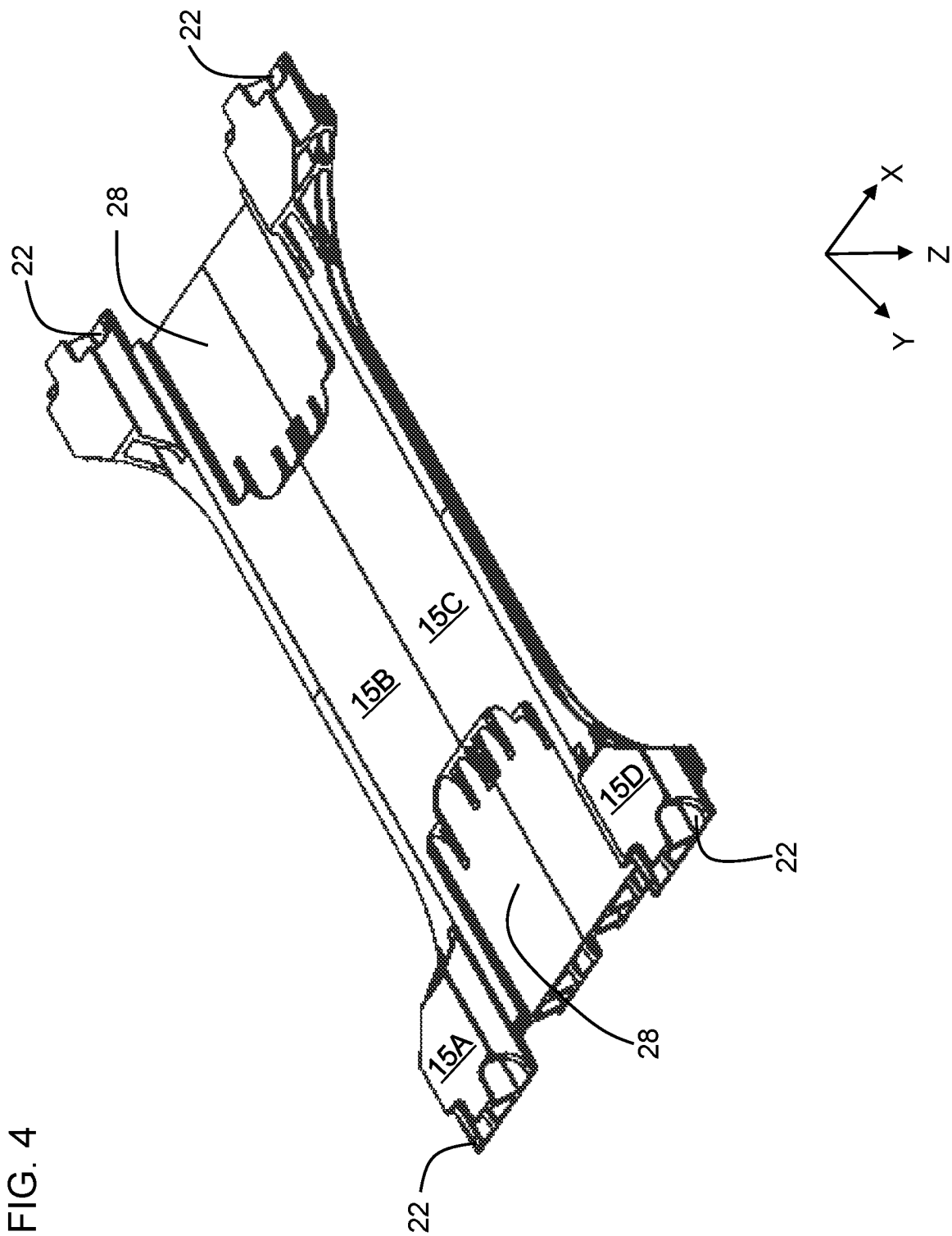
FIG. 4 is a perspective view showing an appearance of a lower surface side of the bolster according to the first embodiment of the invention.

FIG. 4 is a perspective view showing an appearance of a lower surface side of the bolster according to the first embodiment of the invention. FIG. 4 shows a state in which the top and bottom are turned upside down with respect to FIG. 3.

The shaped members 15B and 15C at the center in the X direction include receiving portions 28 on both sides in the Y direction on the lower surface side. The receiving portions 28 are formed by performing notching upward from both ends in the Y direction within a predetermined range. The notch of the receiving portion 28 does not overlap with the central notch 26 and maintains the strength thereof in the Y direction. The receiving portion 28 can receive the air spring 4, and the thickness in the Z direction can be reduced by the amount of the notching.

The shaped members 15A and 15D at both ends in the X direction include fastening portions 22 at both ends in the Y direction. The fastening portion 22 projects outward in the Y direction from end portions of the shaped members 15B and 15C in the Y direction. Therefore, as the shaped members 15A and 15D, shaped members longer than the shaped members 15B and 15C are used. In the shaped members 15A and 15D, the fastening portion 22 protrudes to the lower surface side, and parts other than the fastening portion 22 do not protrude to the lower surface side.

Figure 5:
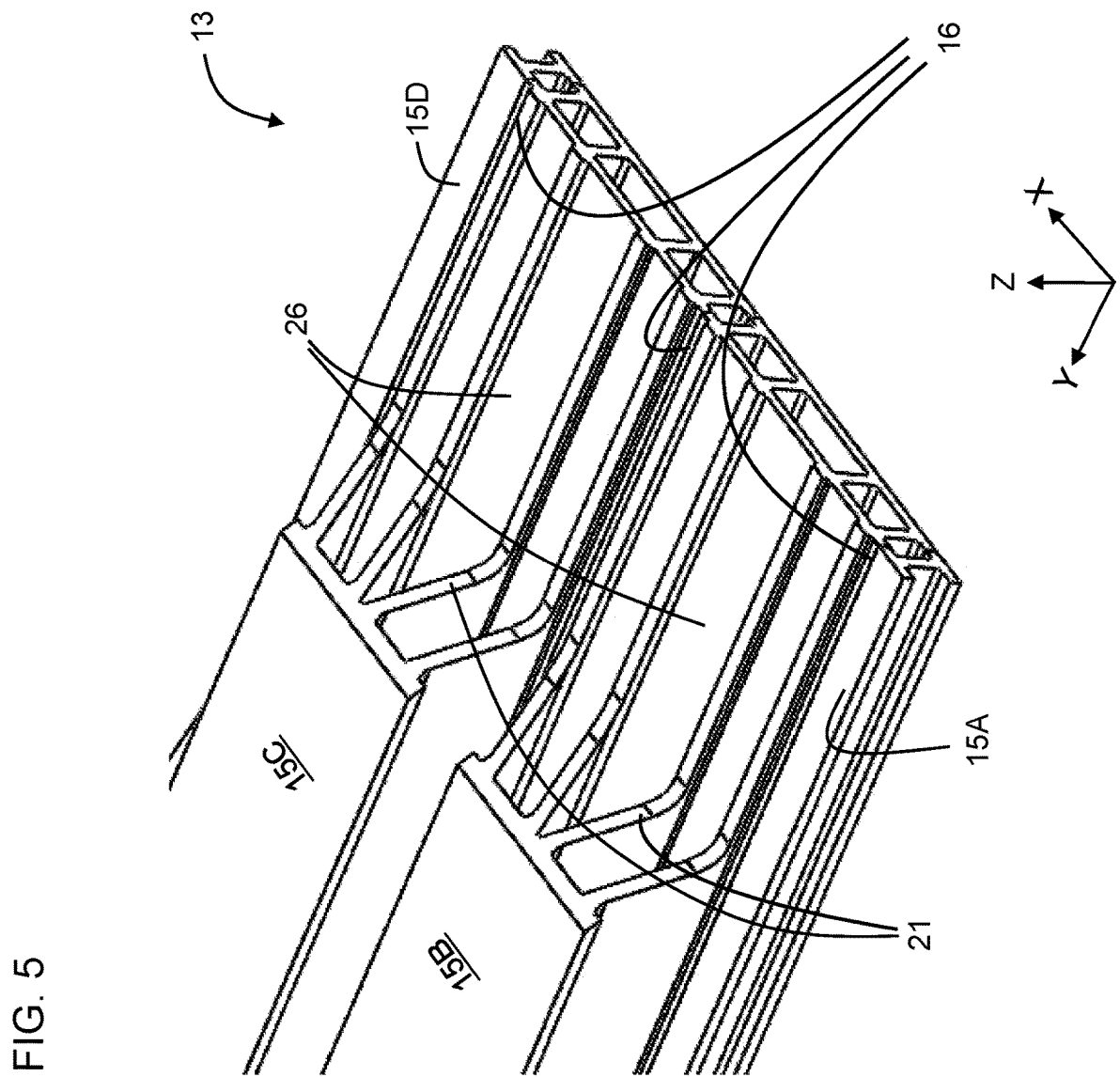
FIG. 5 is an enlarged perspective view showing the joining of shaped members of the bolster according to the first embodiment of the invention.

FIG. 5 is an enlarged perspective view showing the joining of the shaped members of the bolster according to the first embodiment of the invention. FIG. 5 is a view cut along an X-Z plane at the center of the bolster 13 in the longitudinal direction (Y direction) for description.

The shaped member 15A and the shaped member 15B, the shaped member 15B and the shaped member 15C, and the shaped member 15C and the shaped member 15D are joined by welded portions 16. These joints are welded along the Y direction by abutting the face plates of the shaped members. A joint range of the shaped member 15A and the shaped member 15D is a certain range from the upper surface to the lower side. A joint range of the shaped member 15B and the shaped member 15C is a certain range from the lower surface to the upper side.

Figure 6:
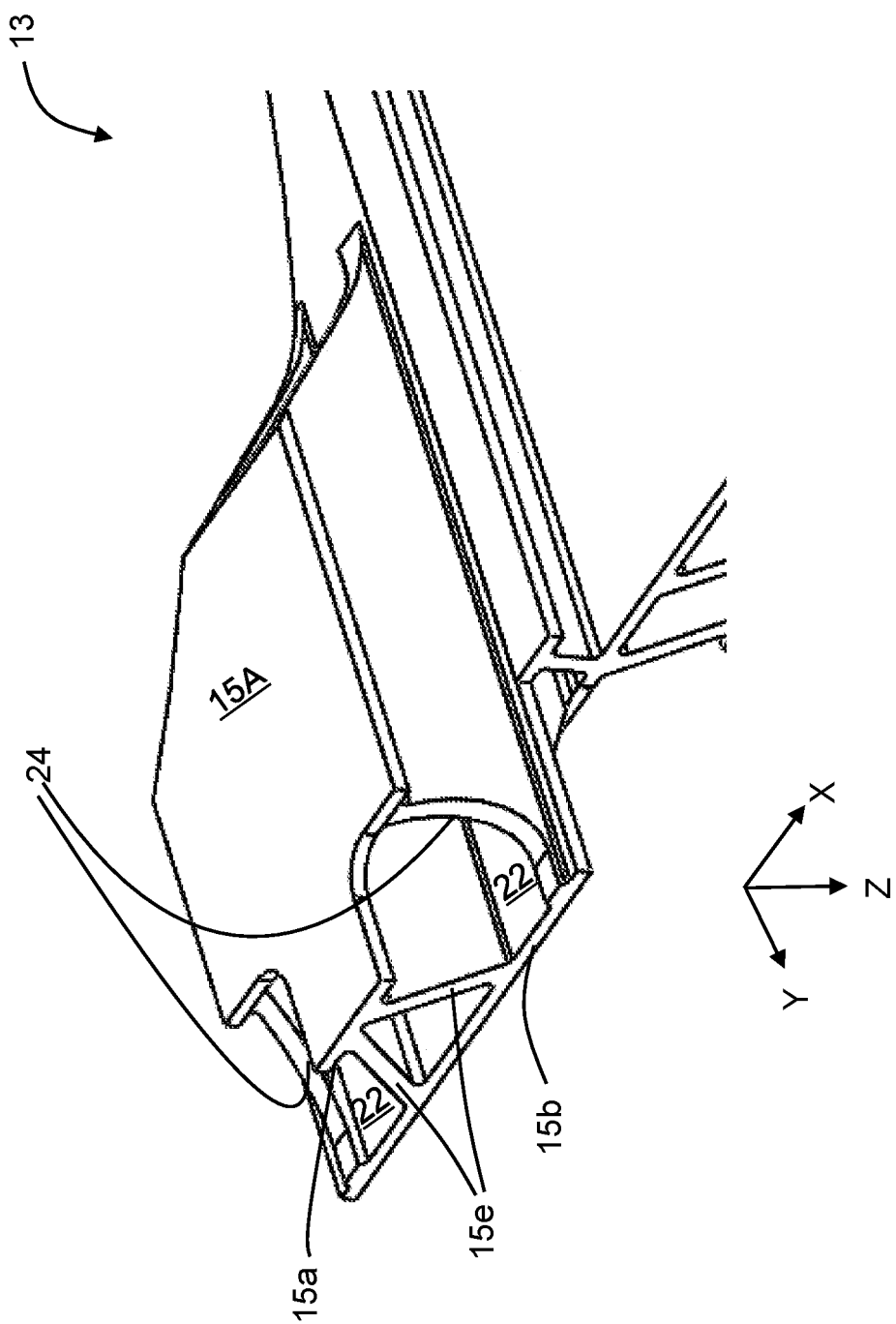
FIG. 6 is an enlarged perspective view showing a fastening portion of the bolster according to the first embodiment of the invention.

FIG. 6 is an enlarged perspective view showing a fastening portion of the bolster according to the first embodiment of the invention. FIG. 5 shows a state in which the top and bottom are turned upside down with respect to FIG. 3 as in FIG. 4.

The fastening portion 22 is formed by a portion of a second face plate 15b in the middle of the shaped member 15A in the Z direction. A notch 24 is formed by notching a portion below a second face plate 15b in the Z direction (corresponding to the upper side in FIG. 6) within a predetermined range from the end in the Y direction. Accordingly, the portion below the end of the second face plate 15b in the Y direction is vacant in a predetermined range, and bolts and nuts can be easily provided and tightened. Each of the notches 24 is formed on a respective one of both sides of an inner rib 15e at the center in the X direction. Accordingly, the inner rib 15e at the center and a part of the lower first face plate 15a connected to the inner rib 15e can be left, and the strength can be maintained. The fastening portion 22 other than that in FIG. 6 has the same configuration.

Figure 7:
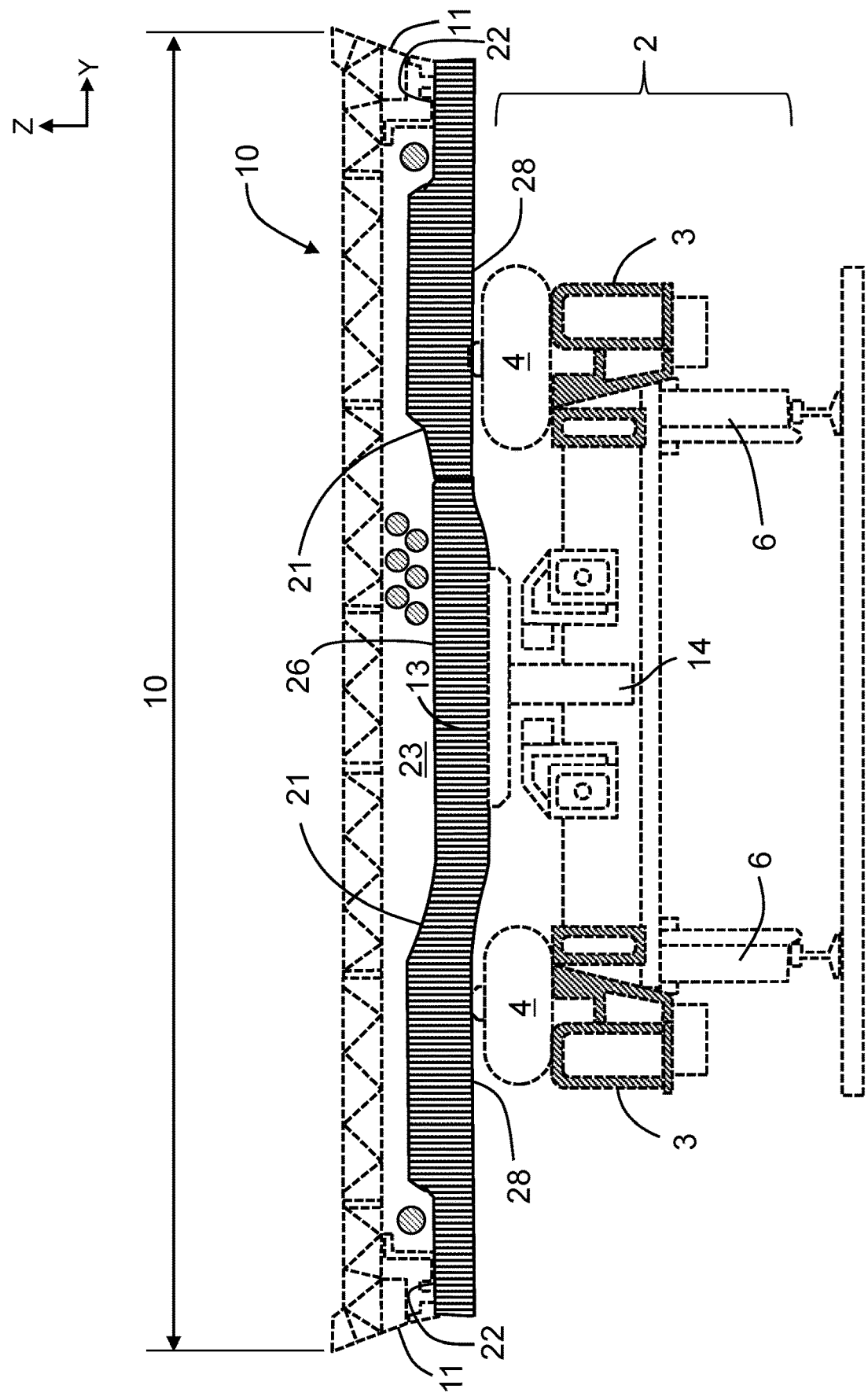
FIG. 7 is a diagram showing an A-A cross section of FIG. 1.

FIG. 7 is a diagram showing an A-A cross section of FIG. 1. As shown in FIG. 7, the bolster 13 is provided between the bogie 2 and the underframe 10.

A space 23 is a space formed between the underframe and the bolster 13. By forming the above-mentioned central notch 26 in the bolster 13, the space 23 can be expanded. This space 23 can be used as a space for providing various members and parts such as pipes, ducts, sensors, and anti-vibration materials. It is possible to form the space 23 of various sizes by adjusting the size of the step 21 while considering the balance with the strength.

The fastening portions 22 of the bolster 13 are portions that fix the side beams 11 to the bolster 13 with bolts or the like. The fastening portions 22 are located near both ends of the structure body 1 in the Y direction and are each fixed to a respective one of the side beams 11 at both ends in the Y direction. The receiving portion 28 of the bolster 13 receives the upper side of the air spring 4 of the bogie 2.

Here, the vertical load is transmitted from the bogie 2 to the bolster 13 via the air spring 4. In that case, the bolster 13 is subjected to bending stress between the side beams 11 and the air springs 4, and bending deformation occurs, which can be reduced by the bending rigidity of the shaped member 15. Further, a moment load is transmitted from the bogie 2 to the bolster 13 via the central pin 14, and torsional deformation occurs, which can be reduced by the torsional rigidity of the shaped member 15.

Figure 8:
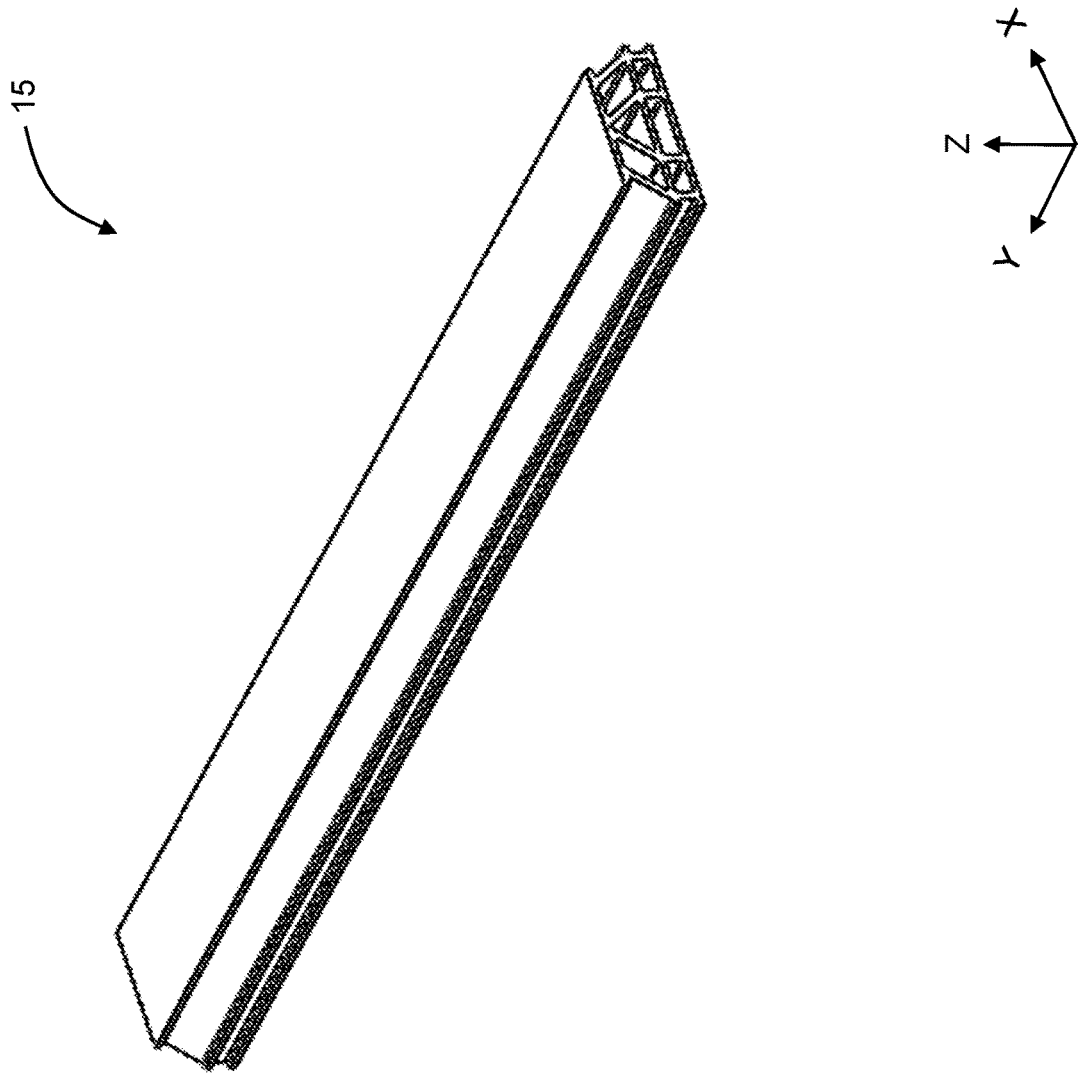
FIG. 8 is a perspective view showing an unprocessed shaped member used in the bolster according to the first embodiment of the invention.
Figure 9:
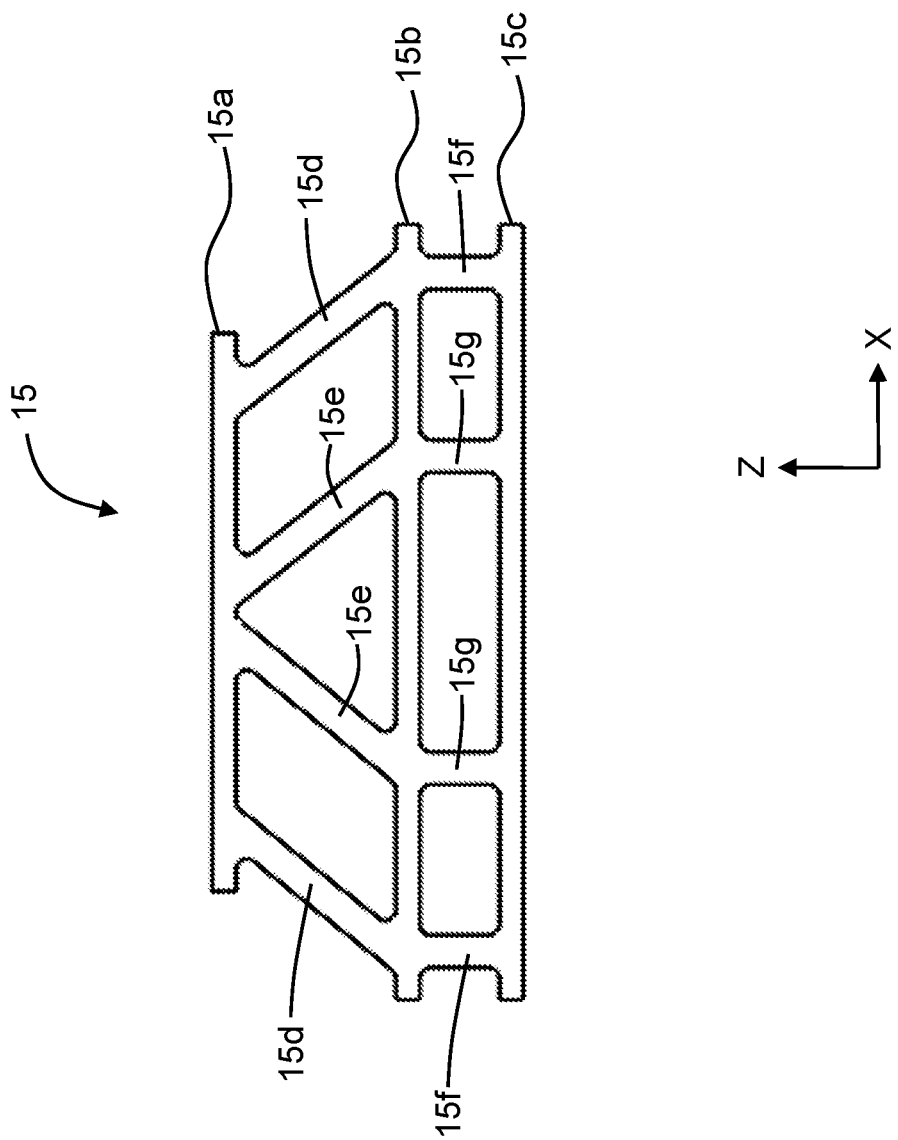
FIG. 9 is a cross-sectional view taken along a plane perpendicular to a longitudinal direction of the unprocessed shaped member used in the bolster according to the first embodiment of the invention.

FIG. 8 is a perspective view showing an unprocessed shaped member used in the bolster according to the first embodiment of the invention. FIG. 9 is a cross-sectional view taken along a plane perpendicular to a longitudinal direction of the unprocessed shaped member used in the bolster according to the first embodiment of the invention.

As the shaped members 15A, 15B, 15C, and 15D described above, the shaped members 15 having the same cross-sectional shape before being processed by machining or the like can be used. The shaped member 15 is formed while maintaining the cross-sectional shape shown in FIG. 9 with the Y direction as the longitudinal direction. An aluminum-shaped member having a multi-layer structure extruded along the width direction (Y direction) of the structure body 1 is applied as the shaped member 15.

As shown in FIG. 9, the shaped member 15 has a three-layer structure in which three face plates, which are the first face plate 15a, the second face plate 15b, and the third face plate 15c, are arranged in parallel in the Z direction from the upper side. The lengths of the second face plate 15b and the third face plate 15c in the X direction are the same, and the length of the first face plate 15a in the X direction is shorter than that of the second face plate 15b and the third face plate 15c. The distance between the first face plate 15a and the second face plate 15b in the Z direction is larger than the distance between the second face plate 15b and the third face plate 15c.

The first face plate 15a and the second face plate 15b are connected by outer ribs 15d on both sides on the outer side in the X direction and two inner ribs 15e on the inner side in the X direction. The outer rib 15d and the inner rib 15e are inclined in a direction in which the outer side in the X direction is narrowed from the second face plate 15b toward the first face plate 15a. Accordingly, the cross section between the first face plate 15a and the second face plate 15b has a trapezoidal shape as a whole. If the cross section has a trapezoidal shape, it is easy to perform processing by machining or the like.

The second face plate 15b and the third face plate 15c are connected by outer ribs 15f on both sides on the outer side in the X direction and two inner ribs 15g on the inner side in the X direction. The outer rib 15f and the inner rib 15g are formed perpendicular to the second face plate 15b and the third face plate 15c. Accordingly, the cross section between the second face plate 15b and the third face plate 15c has a rectangular shape as a whole.

Figure 10:
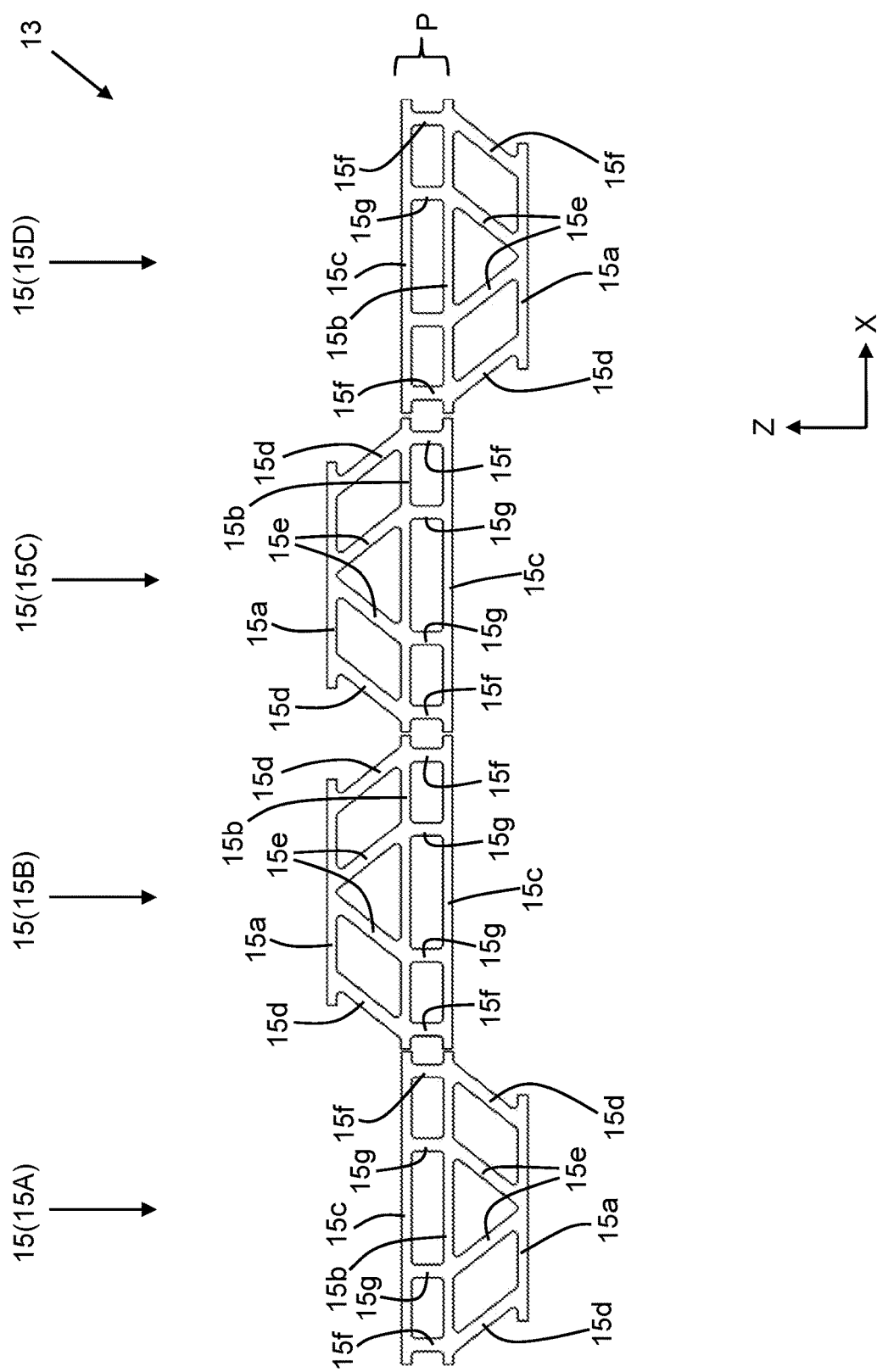
FIG. 10 is a diagram showing a connection state of the shaped members used in the bolster according to the first embodiment of the invention.

FIG. 10 is a diagram showing a connection state of the shaped members used in the bolster according to the first embodiment of the invention. Although FIG. 10 shows the connection by the shaped member 15 before being processed, in reality, the connection can be performed after processing performed by machining or the like.

As shown in FIG. 10, the bolster 13 can be formed by processing and joining the shaped members 15 having the same cross-sectional shape. The shaped members 15A and 15D are connected to the shaped members 15B and 15C by reversing an upper-lower orientation of the shaped members 15. The parts of the shaped members 15B and 15C are combined such that the shaped members 15 protrude above a connection range P, and the parts of the shaped members 15A and 15D are combined such that the shaped members 15 protrude below the connection range P.

The central notch 26 described with reference to FIG. 3 is formed by notching the first face plate 15a, the outer rib 15d, and the inner rib 15e of the shaped member 15 corresponding to the shaped members 15B and 15C.

The receiving portion 28 described with reference to FIG. 4 is formed by notching the third face plate 15c, the outer rib 15f, and the inner rib 15g of the shaped member 15 corresponding to the shaped members 15B and 15C. The outer ribs 15f of the shaped members 15B and 15C located on the sides of the shaped members 15A and 15D may be left uncut to increase the strength.

The side notch 27 described with reference to FIG. 3 is formed by notching the shaped member 15 corresponding to the shaped members 15A and 15D. The central portion in the Y direction is formed by notching a part other than the outer rib 15f on the connecting side with the shaped members 15B and 15C and the second face plate 15b and the third face plate 15c close to the outer rib 15f.

The third face plate 15c and the second face plate 15b of the shaped member 15A are joined to the second face plate 15b and the third face plate 15c of the shaped member 15B, respectively. The second face plate 15b and the third face plate 15c of the shaped member 15B are joined to the second face plate 15b and the third face plate 15c of the shaped member 15C, respectively. The second face plate 15b and the third face plate 15c of the shaped member 15C are joined to the third face plate 15c and the second face plate 15b of the shaped member 15D, respectively.

Figure 11:
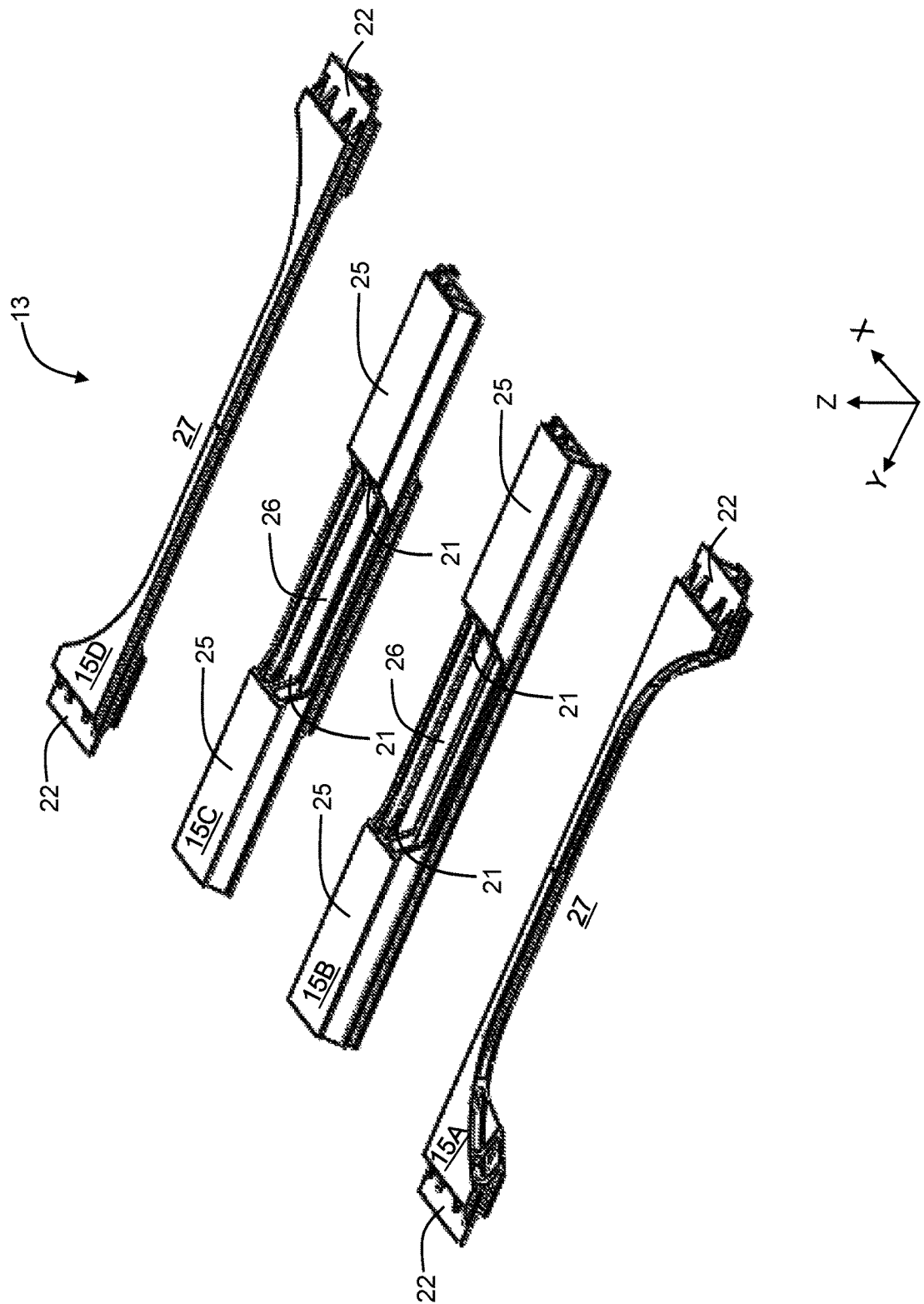
FIG. 11 is a perspective view showing a state before joining of the shaped members in the bolster according to the first embodiment of the invention.

FIG. 11 is a perspective view showing a state before connecting of the shaped members in the bolster according to the first embodiment of the invention. The shaped members 15A, 15B, 15C, and 15D are subjected to machining on the shaped member 15 shown in FIGS. 8 and 9. The longitudinal directions of the shaped members 15A, 15B, 15C, and 15D are all the same Y direction.

The shaped member 15B and the shaped member 15C can be processed into the same shape to be used. A cutting process or the like is performed to form the central notch 26 and the receiving portion 28 described above. The shaped member 15A and the shaped member 15D processed into the same shape can be symmetrically arranged and used. A cutting process or the like is performed to form the side surface notch 27 and the notch 24.

Then, the processed shaped members 15A, 15B, 15C, and 15D are joined side by side in the X direction. Positions of the shaped members 15B and 15C are the same in the Y direction. The shaped members 15A and 15D are joined side by side with both ends in the Y direction protruding from the shaped members 15B and 15C only at the fastening portion 22.

Effects

As described above, the bolster 13 can be lightweight and rigid using the shaped member 15 which is an extruded-shaped member. Especially as an aluminum-shaped member, weight reduction and ensuring rigidity can be achieved. The rigidity can be improved since the shaped member 15 is the multi-layered shaped member 15. Further, by processing the shaped member 15, a space 23 can be secured between the underframe 10 and the bolster 13 to provide various members and parts such as pipes, ducts, sensors, and anti-vibration materials.

The bolster 13 can be lightweight, rigid, and low cost by processing the shaped members 15 having the same cross-sectional shape and joining the shaped members 15 in combination. In that case, the function of the bolster 13 can be maintained at a high level, such as securing the rigidity and securing the space, by contriving the method for combining the shaped members 15. The number of parts can be reduced and the cost of the vehicle can be reduced by sharing the shaped members 15 with a shaped member used in other parts of the structure body 1 of the railroad vehicle 100.

The bolster 13 can be securely fixed to the side beam 11 by forming the fastening portion 22. It is possible to securely join the shaped members 15 to each other and to increase the strength of the entire bolster 13 by securing the predetermined connection range P (FIG. 10) and joining the shaped members 15 with a plurality of face plates. It is possible to secure the height of the air spring 4 in the upper-lower direction by providing the receiving portion 28 without raising the position of the underframe 10.

Second Embodiment

Figure 12:
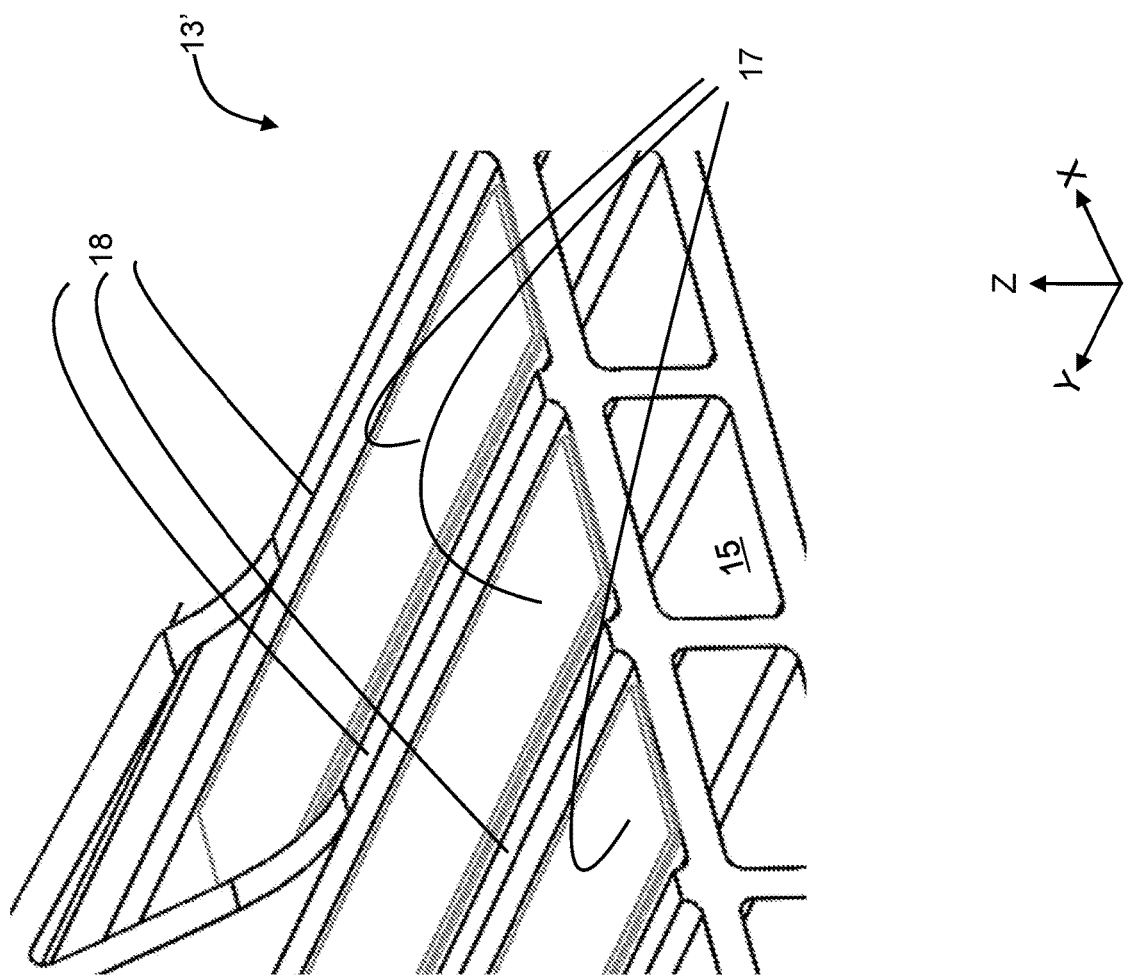
FIG. 12 is an enlarged perspective view showing a configuration of a bolster according to a second embodiment of the invention.

FIG. 12 is an enlarged perspective view showing a configuration of a bolster according to a second embodiment of the invention. FIG. 12 shows a view cut along an X-Z plane at the center of a bolster 13' in the longitudinal direction (Y direction) for description. In the second embodiment, differences from the first embodiment will be mainly described, the same parts are designated by the same reference numerals, and the same description is omitted unless otherwise specified.

The bolster 13' according to the second embodiment has a configuration in which a reinforcing member 17 is additionally provided to the bolster 13 according to the first embodiment. The reinforcing member 17 is a plate-shaped member that reinforces the bolster 13' by being joined to the upper surface of the shaped member 15. For example, the reinforcing member 17 is provided between the ribs 18 (the portion remained after the outer rib 15d and the inner rib 15e are notched) along the Y direction on the upper surface of the central notch 26 of the shaped members 15B and 15C. In that case, the reinforcing member 17 reinforces the bolster 13' with a length of the central notch 26 in the Y direction or longer.

In the second embodiment, in addition to the effects according to the first embodiment, using the reinforcing member 17, the bending rigidity of the bolster 13' can be increased, and the bending deformation of the bolster 13' when a bending moment is received can be reduced. In particular, the bending rigidity can be effectively improved by reinforcing the vicinity of the central notch 26 where the thickness is small.

Third Embodiment

Figure 13:
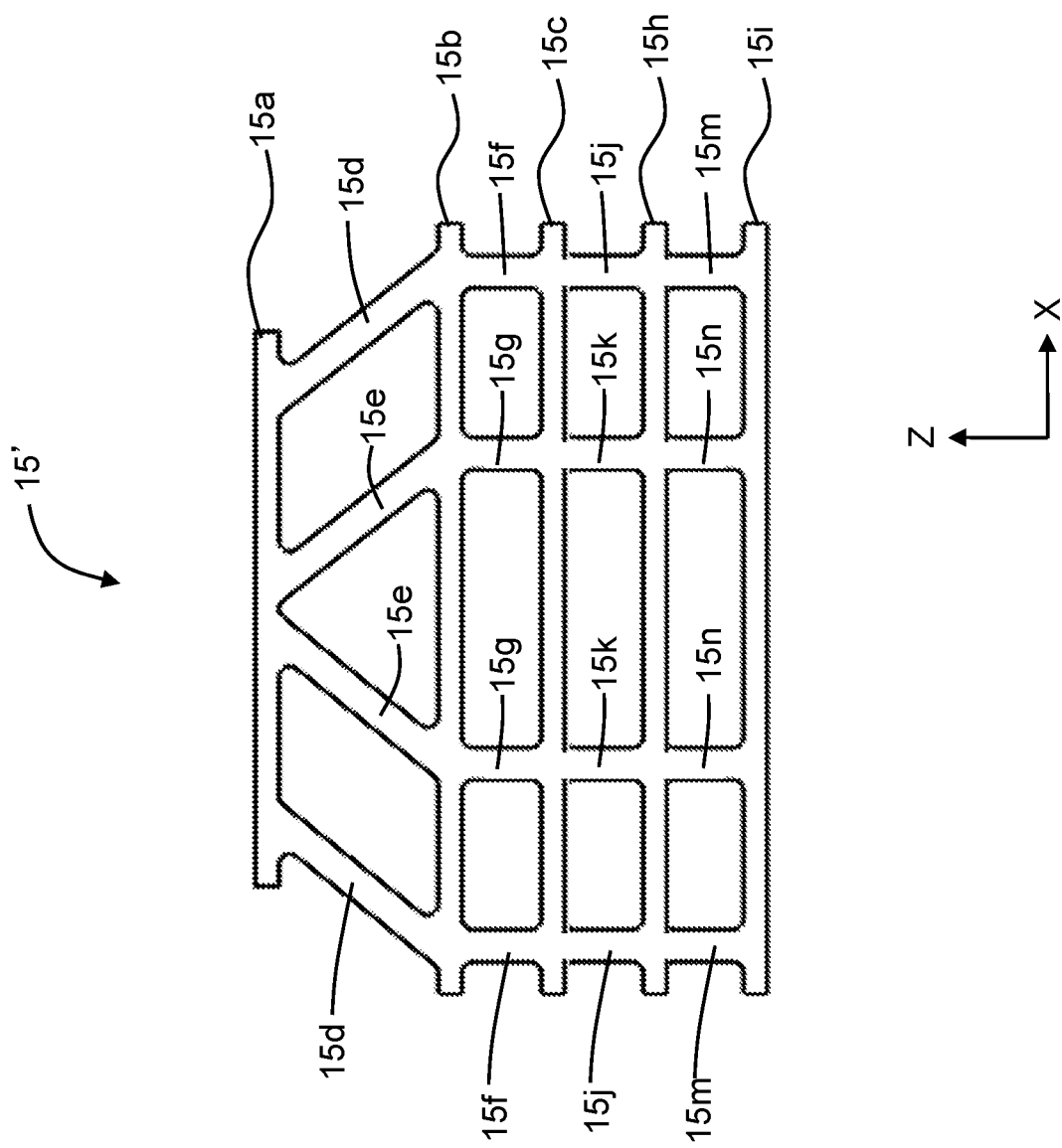
FIG. 13 is a cross-sectional view taken along a plane perpendicular to a longitudinal direction of an unprocessed shaped member used in a bolster according to a third embodiment of the invention.

FIG. 13 is a cross-sectional view taken along a plane perpendicular to a longitudinal direction of an unprocessed shaped member used in a bolster according to a third embodiment of the invention. FIG. 14 is a diagram showing a connection state of the shaped members used in the bolster according to the third embodiment of the invention. In the third embodiment, differences from the first embodiment will be mainly described, the same parts are designated by the same reference numerals, and the same description is omitted unless otherwise specified. Although FIG. 13 shows the connection by the shaped member 15 before being processed, in reality, the connection can be performed after processing performed by machining or the like.

In the third embodiment, the shaped member 15' has a five-layer structure in which two face plates (two layers) are added downward from the shaped members 15 according to the first embodiment. Specifically, a fourth face plate 15h and a fifth face plate 15i that are parallel to the third face plate 15c and have the same size are added below the third face plate 15c. Between the third face plate 15c and the fourth face plate 15h, outer ribs 15j and inner ribs 15k are connected to the third face plate 15c and the fourth face plate 15h. Between the fourth face plate 15h and the fifth face plate 15i, outer ribs 15m and inner ribs 15n are connected to the fourth face plate 15h and the fifth face plate 15i. These ribs have the same shape as the outer rib 15f and the inner rib 15g. The second face plate 15b, the third face plate 15c, the fourth face plate 15h, and the fifth face plate 15i have the same interval in the z direction.

As shown in FIG. 14, shaped members 15A' and 15D' are connected to shaped members 15B' and 15C' by reversing the upper-lower direction of the shaped member 15 to form a bolster 13". The shaped members 15A', 15B', 15C', and 15D' are joined by four face plates which are the second face plate 15b, the third face plate 15c, the fourth face plate 15h, and the fifth face plate 15i. The second face plate 15b and the fifth face plate 15i, and the third face plate 15c and the fourth face plate 15h are joined to each other in the shaped member 15A' and the shaped member 15B', and the shaped member 15C' and the shaped member 15D'. The shaped member 15B' and the shaped member 15C' are joined by the same face plates.

In the third embodiment, in addition to the effects according to the first embodiment, the length of the connection range P in the Z direction can be longer than that according to the first embodiment, and the number of face plates to be connected can be increased. Accordingly, the bending rigidity and the torsional rigidity of the shaped member 15' are increased, and the bending deformation and the torsional deformation of the bolster 13" when the bending moment and the torsional moment are received can be reduced.

The invention is not limited to the embodiments described above and includes various modifications. For example, the embodiments described above are described in detail for easy understanding of the invention, and the invention is not necessarily limited to those including all of the configurations described above. A part of a configuration according to a certain embodiment can be replaced with a configuration according to another embodiment, and a configuration according to a certain embodiment can be added to a configuration according to another embodiment. A part of the configuration according to the embodiments may be added, deleted, or replaced with another configuration.

For example, it is also possible to attach, to the bolsters 13, 13', 13", a member that receives the load from a yaw damper attached to the bogie 2.

Four examples of the number of the shaped members used for the bolsters are shown. The number of shaped members may be changed and applied, for example, two or more, three or more, and four or more, in consideration of the shapes of the shaped members or the bolsters.

The number of face plates that join the shaped members is shown in the first embodiment as 2 and in the third embodiment as 4. However, the number of face plates that join the shaped members is not limited to this, and can be increased to, for example, 2 or more, 3 or more, and 4 or more to improve the rigidity.

The reinforcing member 17 according to the second embodiment may be applied to a place other than the central notch 26 to perform reinforcing.

REFERENCE SIGN LIST

1: structure body
2: bogie
3: bogie frame
4: air spring
10: underframe
11: side beam
12: end beam
13, 13', 13": bolster
14: central pin
15, 15A, 15B, 15C, 15D, 15', 15A', 15B', 15C', 15D': shaped member
15a: first surface plate
15b: second surface plate
15c: third surface plate
15h: fourth surface plate
15i: fifth surface plate
15d, 15f, 15j, 15m: outer rib
15e, 15g, 15k, 15n: inner rib
16: welded portion
17: reinforcing member
18: rib
19: center beam
21: step
22: fastening portion
23: space
24: notch
25: upper protrusion
26: central notch
27: side notch
28: receiving portion
30: side structure body
40: end construction body
50: roof structure body
100: railroad vehicle
X: longitudinal direction
Y: width direction
Z: height direction

The invention claimed is:

1. A bolster structure of a railroad vehicle that is provided on an underframe constituting a floor of a structure body of the railroad vehicle, comprising:
   a plurality of shaped members formed by joining the plurality of shaped members having a multi-layer structure in which a width direction of the structure body is an extrusion direction,
   wherein the plurality of shaped members include:
   a shaped member having a region in which a part of layers on an underframe side is notched at a center of the structure body in the width direction; and
   a shaped member including a fastening portion formed by notching a part of layers at both ends of the structure body in the width direction, and
   a side beam of the underframe is fixed by the fastening portion,
   wherein as the plurality of shaped members, those obtained by machining shaped members having the same cross-sectional shape are used,
   wherein the plurality of shaped members are joined side by side in a longitudinal direction of the structure body, and
   wherein among the plurality of shaped members, the shaped member located on an inner side of the structure body in the longitudinal direction includes a portion protruding upward from a joint portion, and the shaped member located on an outer side of the structure body in the longitudinal direction has a portion protruding downward from a joint portion.

2. The bolster structure of a railroad vehicle according to claim 1,
   wherein a reinforcing member is provided on an upper surface of the shaped member.

3. The bolster structure of a railroad vehicle according to claim 1,
   wherein a shape of a cross section of the shaped member perpendicular to the longitudinal direction includes a substantially trapezoidal portion.

4. The bolster structure of a railroad vehicle according to claim 1, wherein the shaped member has the same cross-sectional shape as a shaped member used in the structure body other than the bolster structure.

5. A railroad vehicle including the bolster structure according to claim 1.

* * * * *